Aug. 20, 1968   R. L. PERES   3,397,576
LIQUID METERING SYSTEMS
Filed Feb. 7, 1966   3 Sheets-Sheet 1

INVENTOR
ROBERT LOUIS PERES
BY
Mason, Fenwick & Lawrence
ATTORNEYS

INVENTOR
ROBERT LOUIS PERES
BY
Mason, Fenwick & Lawrence
ATTORNEYS

United States Patent Office 3,397,576
Patented Aug. 20, 1968

3,397,576
LIQUID METERING SYSTEMS
Robert L. Peres, Neuilly-sur-Seine, France, assignor to The Associated Octel Company Limited, London, England, and Octel S.A., Paris, France
Filed Feb. 7, 1966, Ser. No. 525,661
Claims priority, application Great Britain, June 11, 1965, 24,799/65
4 Claims. (Cl. 73—200)

ABSTRACT OF THE DISCLOSURE

A liquid metering system employing two reservoirs connected through a meter for transfer of a first liquid from one to the other with valve means for alternately supplying a second liquid to the reservoirs to cause displacement of a given metered amount of the first liquid from one reservoir to the other and for discharging the same amount of the second liquid from the other reservoir with valve means for always directing the transferred liquid in the same direction through the meter in the connection between the reservoirs.

---

This invention relates to methods and apparatus for dispensing controlled and measured quantities of liquid. Particularly, but not exclusively the invention relates to methods and apparatus for dispensing controlled and measured quantities of liquids of corrosive or toxic nature which contain small amounts of solid particle impurities and which are thus deterimental to delicate measuring apparatus such as flow meters. Problems of this nature arise particularly in the case of measuring the flow rate of anti-knock compounds such as lead alkyls as they are being metered into gasoline, particularly when being fed in a continuous manner into a pipeline through which the gasoline is flowing.

As the invention is particularly concerned with the metering of lead alkyls into gasoline, the invention is described with reference to this particular operation, although it will be understood that the invention is by no means limited to such an operation and that the method and apparatus described may have many other applications.

In the past the problem of protecting delicate flow meters from the detrimental effects of the solid impurities such as normally present in lead alkyls has been solved by protecting the flow meter with two filters placed in parallel in the feed line to the meter. First of all the feed is fed through one of the two filters until such time as this filter becomes blocked whereupon the feed is switched through the second filter so that the first may be cleaned. In view of the highly toxic nature of lead alkyl the cleaning process constitutes a serious health hazard and is therefore to be avoided.

The present invention simplifies and improves the above-mentioned procedures.

In accordance with the first aspect of the present invention two filters are provided, and they are located one on either side of the flow meter, or other metering device, so that the lead alkyl, or other liquid, flows therethrough in series. Also provided at suitably placed locations are a plurality of valve mechanisms whereby the flow through the two filters may be reversed at appropriate intervals whilst maintaining the same direction of flow through the meter. In this way one filter is protecting the flow meter while the other is automatically being cleaned by back-flushing with the lead alkyl stream. After a while the flow is reversed so that the newly cleaned filter protects the flow meter while the now dirty filter is back-flushed. Desirably but not necessarily the two filters are themselves protected by settling tanks wherein the larger solid particles in the lead alkyl drawn from storage are allowed to settle before ever reaching the filter. By using this procedure the flow meter is always protected by one or other of the two filters and the dirty filter is cleaned automatically without requiring removal or dismantling, thereby eliminating any health hazard.

In an alternative arrangement the two filters may simply be replaced by the two settling tanks. This will in particular be possible in the case where the flow rate is low and the cross-sectional area of the settling tanks is large as compared with the cross-sectional area of the pipes. In such arrangement solid particles in the incoming stream will settle in the first tank during the first cycle and so will not pass through the flow meter. Then during the second cycle the particles will settle in the other tank while those which settled in the first tank during the first cycle will be swept out again by the reversed flow.

In accordance with the second aspect of the present invention, the lead alkyl is caused to flow alternately into the two reservoirs which are coupled by a pipeline and which contain a fluid medium, usually water, which is immiscible with the lead alkyl and which is displaced from one reservoir to the other and back again as each in turn is filled with lead alkyl. As each reservoir is filled with lead alkyl the other reservoir, which was filled with lead alkyl on the previous cycle, is discharged into the gasoline stream. The alternating cycle of filling and discharging the reservoirs is preferably controlled automatically by means of float switches in one or other or both reservoirs which are actuated by the lead alkyl when a particular level is reached. The float switches serve to actuate appropriately placed valves to reverse the flow directions. Throughout the operation the flow rate of the immiscible fluid medium between the two reservoirs is measured to indicate the flow rate of the lead alkyl. The flow rate of the displaced fluid medium may be measured either by means of a flow meter or by means of a metering pump.

The methods and apparatus according to the invention are further described with reference to the accompanying drawings which are presented by way of example. In the drawings.

Figure 1:
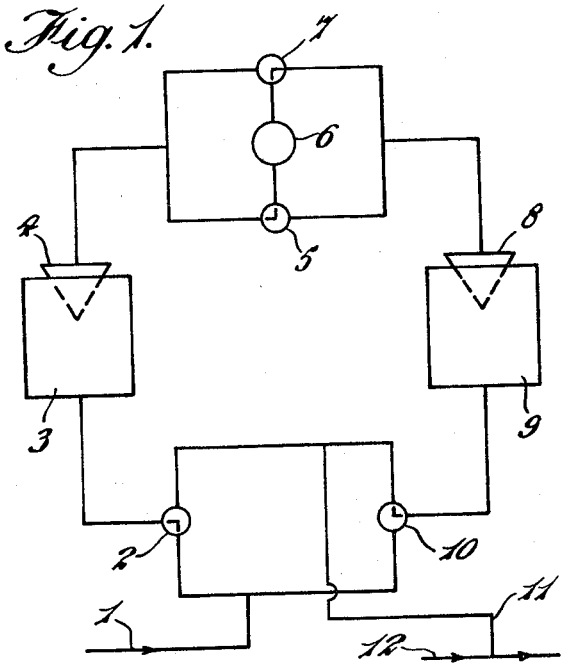
FIG. 1 is a flow diagram of a first metering system in accordance with the invention.

Referring first of all to the system shown in FIG. 1, the lead alkyl, or other liquid, is fed from a storage tank or other liquid source (not shown) through line 1 and a 3-way valve 2 to a settling tank 3. In the settling tank the flow rate is slowed down so that the heavier solid impurities settle out before reaching a filter 4. From the filter 4 the lead alkyl passes through a second 3-way valve 5 to a flow meter 6 and then leaves the meter through a third 3-way valve 7. The liquid then passes through a second filter 8 in a back-flushing direction, into a second settling tank 9. From there the lead alkyl flows through a 3-way valve 10 into line 11 which feeds the lead alkyl into the gasoline flow line 12.

After a period of time, for example 30 minutes, valves 2, 5, 7 and 10 are reversed, either by hand or automatically, to reverse the direction of flow through the filters. The direction of flow through the meter 6 remains the same. In this cycle the filter 8 actively filters the liquid before passage through the meter while the filter 4 is back-flushed by the liquid stream and at least part of the solid material deposited thereon and in the settling tank 3 is carried away with the liquid stream.

It will thus be seen that the above system provides a continuous method for the metering of the lead alkyl with the meter being protected at all times by a filter, yet without need for removal of the filter element for cleaning. The liquid lead alkyl may be circulated through the system by any suitable means. For example, this system can operate on a gravity feed, or by means of an educator in the gasoline line by means of which the gasoline stream acts to suck the lead alkyl through the metering system. Alternatively for other applications the system may be provided with a suitably placed pump or metering pump. As mentioned above, this system may be modified to operate with either these two filters or the two settling tanks alone.

Figure 2:
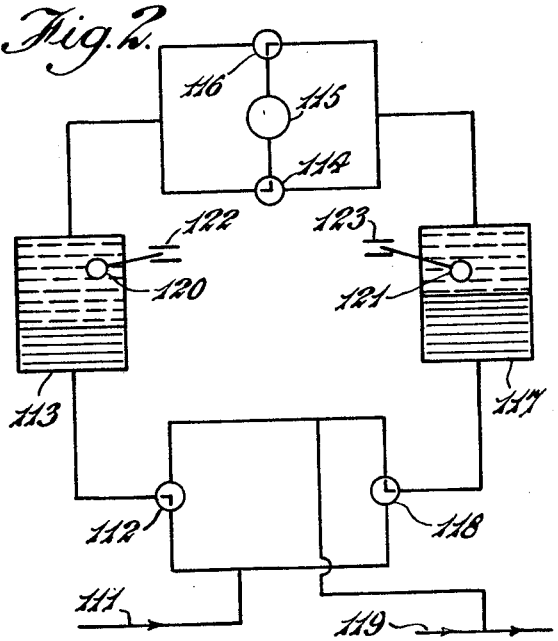
FIG. 2 is a flow diagram of a second metering system in accordance with the invention.

Referring now to the system illustrated in FIG. 2, the lead alkyl is fed through line 111, through a 3-way valve 112 into a reservoir 113. This reservoir contains a liquid, such as water, which is lighter than and immiscible with the lead alkyl. As the lead alkyl level in the reservoir rises the water is displaced from the top of the reservoir through a 3-way valve 114 to the flow meter 115 and through a further 3-way valve 116, to a second reservoir 117. The reservoir 117 has been filled with lead alkyl on the previous cycle and the incoming water from reservoir 113 displaces the lead alkyl which is discharged from the bottom of the reservoir 117 through a 3-way valve 118 into the gasoline line 119.

Located in the water phase of each reservoir is a float 120 and 121 operatively connected to switches 122 and 123 respectively. When the lead alkyl level in reservoir 113 reaches the float 120 the switch 122 is actuated to cause reversal of the valves 112, 114, 116 and 118. The flow of lead alkyl is now reversed so that the incoming lead alkyl is fed to reservoir 117 and the lead alkyl is fed into the gasoline stream from reservoir 113.

The reversal of the valves 114 and 116 ensures that the water displaced from reservoir 117 flows in the same direction to the meter 115. When the lead alkyl level in reservoir 117 reaches the float 121, switch 123 is actuated again to reverse the valves 112, 114, 116 and 118 and the system is ready for another cycle.

It will be seen that this second system according to the invention provides an entirely automatic feed system which entirely eliminates the need for filters to protect the measuring equipment.

As in the previous case, the flow through the system may be by gravity, or by means of a pump or by an eductor in the gasoline flow line. Again a particularly preferred system employs a metering pump in place of the flow meter 115. Such a metering pump has the particular advantage that flow rates of lead alkyl can be obtained which are well below the limit of measurability by a conventional flow meter.

In the system illustrated in FIG. 2, there will of course be a valve provided whereby the system can be filled with water ready for use and occasionally drained for servicing. The precise location and mode of operation of this valve is not critical but a preferred filling arrangement is illustrated in the modified system illustrated in FIG. 3. This filling arrangement includes an air trap for trapping any air which may feed into the system and means are provided for occasionally releasing this air from the system.

Figure 3:
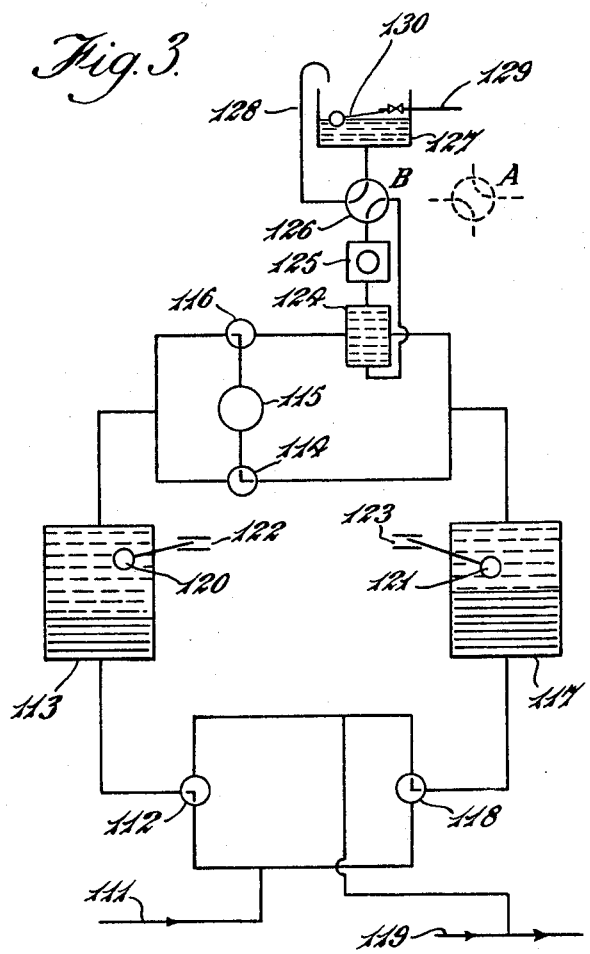
FIGS. 3, 4 and 5 are modified versions of the systems illustrated in FIGS. 1 and 2.

Referring to FIG. 3, the system is of basically the same design as the system of FIG. 2. However, in one of the lines between the reservoir 117 and the meter 115 there is fitted an air separating vessel 124 connected by a short line to a glass fronted trap 125. Above the trap is a 4-way valve 126 with its four ports connected to the trap 125, to the bottom of the sparating vessel 124, to a cistern 127 and an air vent pipe 128. The cistern 127 is mounted above the 4-way valve and is fitted with a water feed 129 and conventional ball valve arrangement 130.

To fill the system with water the 4-way valve 126 is placed in position A (shown in broken lines) connecting cistern 127 to the separating vessel 124 and the air trap 125 to the air vent 128. The system now fills and when full the valve 126 is moved to position B. This isolates the system from the cistern and air vent and the system is ready for use. Any air which subsequently leaks into the system rises in the air trap and can be seen through the sight glass. Periodically the air collected in the trap can be vented by reversing the valve 126 into position A and thereby automatically venting the air and simultaneously topping up the water level from the cistern.

In any of the systems described the meter may be protected by additional filters and these will have to be cleaned but only very occasionally since the bulk of the solid impurities will never come near the meter. Such additional filters are however unnecessary and can normally be omitted.

While the second system as described employs water as the second liquid it will be realised that any other fluid medium may be used which is immiscible and non-reactive with the lead alkyl. Further, it is not necessary that the second fluid medium is less dense than the liquid to be blended since it will be quite possible to use a liquid of higher density which is displaced from the bottom of one reservoir to the bottom of the other and back again while the liquid to be metered is fed to and taken from the upper part of each reservoir.

Figure 4:
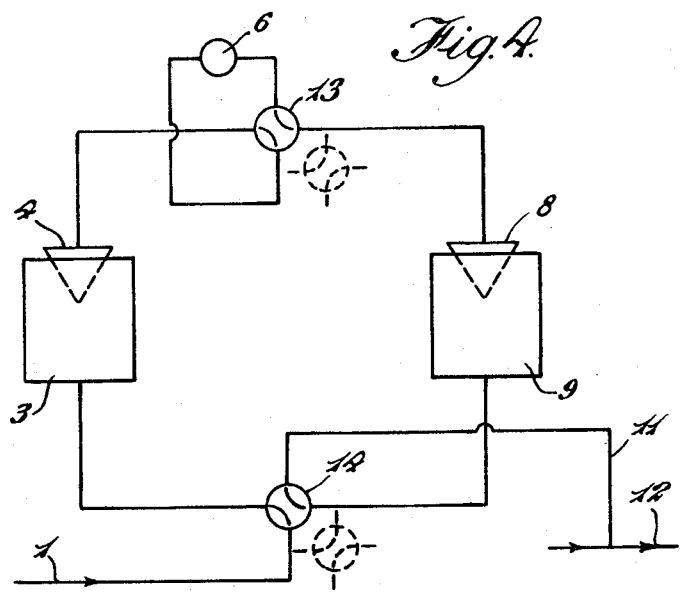
Figure 5:
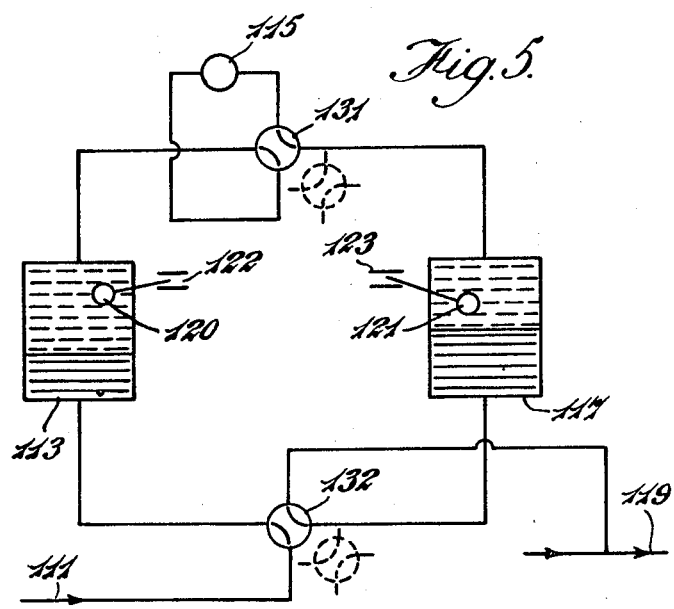

In the systems illustrated the reversal of the flow direction is achieved by means of appropriately placed 3-way valves. These are of conventional construction and are operated by conventional means. For example, in the automatically operated systems of the invention these valves will generally be operated by compressed air operating to move the valve plunger from one position to the other. Since 3-way valves are more suitable for automatic control of this kind they are preferred, but it will be understood that other types of valves may be used to bring about the same effect. For instance, in the systems illustrated each pair of 3-way valves may be replaced by a single 4-way valve. Two systems illustrating the use of 4-way valves are illustrated in FIG. 4 and 5. The system illustrated in FIG. 4 is essentially similar to that illustrated in FIG. 1, the same reference numerals being used, except that flow reversal is effected by means of the two 4-way valves 13, 14 by movement from the full-line position to the dotted line position. Likewise the system illustrated in FIG. 5 is essentially similar to that illustrated in FIG. 2, the same reference numerals again being used, except that flow reversal is effected by means of two 4-way valves 131 and 132.

It will be obvious too that both systems described in accordance with the invention will embody valves and flow meters in addition to those particularly described. In particular, the systems may include a control valve whereby the rate of flow of lead alkyl through the systems may be regulated. It will be apparent too that the systems may be provided with automatic control means whereby the rate of flow of lead alkyl is automatically varied depending upon the rate of flow of gasoline. Automatic close down means may also be provided to switch off the system in case of emergency. Such additional equipment will, however, be entirely conventional and will be employed automatically by those skilled in the art. This being so and the invention being understandable from the description already given, no further description of these conventional parts is given.

I claim:

1. A liquid metering system for measuring the amount of a first liquid discharged by the system, said metering system comprising:
    (a) a pair of reservoirs for a second non-corrosive liquid immiscible with the first liquid;
    (b) a connection between the two reservoirs for the flow of said second immiscible liquid to and fro between the reservoirs;

(c) a meter in said connection for measuring the amount of the second liquid flowing to and fro between the reservoirs;

(d) a feed pipe connected for feeding the first liquid into the metering system;

(e) a discharge pipe for discharging the first liquid from the metering system;

(f) a first valve mechanism for connecting the feed pipe alternatively to one of the two reservoirs so that said first liquid displaces said second liquid from said one reservoir into which said feed pipe is connected and said displaced liquid flows through said meter to displace a quantity of said first liquid previously introduced into the other reservoir with said first valve mechanism including means for connecting the other reservoir to the discharge pipe; and (g) a second valve mechanism in said connection between the reservoirs for always maintaining the same direction of flow through said meter.

2. A liquid metering system according to claim 1, wherein said valve mechanisms each comprise a pair of 3-way valves.

3. A liquid metering system according to claim 1, including (h) a control mechanism for said valve mechanisms; and (i) at least one float operated switch in said control mechanism, said switch being operated by the interface of the two liquids in one or other of the two reservoirs to operate said valve mechanisms to reverse the direction of flow when the said interface reaches a predetermined level.

4. A liquid metering system according to claim 3, including an air trap for trapping air which may leak into the system and a filling system for filling the reservoirs with said immiscible liquid, said air trap and filling system comprising:

(j) an air separating vessel in the connection between the two reservoirs;

(k) an air trap connected to the separating vessel;

(l) a cistern for said immiscible liquid;

(m) an air vent line; and (n) a 4-way valve operable in one position to connect the cistern to the separating vessel and the air vent line to the air trap, and in the other, the cistern to the vent and the separating vessel to the trap.

References Cited

UNITED STATES PATENTS

| | | | |
|---|---|---|---|
| 498,314 | 5/1893 | Skinner | 73—221 |
| 2,135,302 | 11/1938 | Everson | 73—194 |
| 2,325,695 | 8/1943 | McAfee | 73—219 |
| 2,529,937 | 11/1950 | Hale | 73—263 |
| 2,920,483 | 1/1960 | Hebard et al. | 73—221 |
| 2,954,693 | 10/1960 | Nelson | 73—221 |

FOREIGN PATENTS

| | | |
|---|---|---|
| 247,025 | 11/1947 | Switzerland. |
| 156,774 | 8/1939 | Germany. |
| 207,545 | 2/1940 | Switzerland. |
| 553,328 | 6/1932 | Germany. |

JAMES J. GILL, *Primary Examiner.*

R. S. SALZMAN, *Assistant Examiner.*